United States Patent [19]
Cornelius et al.

[11] 3,958,413
[45] May 25, 1976

[54] COMBUSTION METHOD AND APPARATUS
[75] Inventors: Walter Cornelius, Troy; Hans P. Fredriksen, Sterling Heights, both of Mich.
[73] Assignee: General Motors Corporation, Detroit, Mich.
[22] Filed: Sept. 3, 1974
[21] Appl. No.: 502,754

[52] U.S. Cl............................. 60/39.06; 60/39.23; 60/39.65; 60/39.71; 60/39.74
[51] Int. Cl.²........................ F02C 7/26; F02C 9/14
[58] Field of Search............ 60/39.06, 39.23, 39.65, 60/39.71, 39.02, 39.03; 239/402.5, 403, 405

[56] References Cited
UNITED STATES PATENTS

| | | | |
|---|---|---|---|
| 1,665,800 | 4/1928 | Strachan | 239/405 |
| 2,446,059 | 7/1948 | Peterson | 60/39.65 |
| 2,458,066 | 1/1949 | Farkas | 60/39.65 |
| 2,618,928 | 11/1952 | Nathan | 60/39.65 |
| 3,078,672 | 2/1963 | Meuren | 60/39.65 |
| 3,229,464 | 1/1966 | Mock | 60/39.65 |
| 3,361,182 | 1/1968 | Pilland | 239/406 |
| 3,765,171 | 10/1973 | Hagen | 60/39.23 |

FOREIGN PATENTS OR APPLICATIONS

| | | | |
|---|---|---|---|
| 254,098 | 4/1948 | Switzerland | 239/403 |
| 1,451,393 | 9/1964 | Germany | 239/400 |

OTHER PUBLICATIONS
Wade, et al.; Low Emissions Combustion for the Regenerative Gas Turbine, Transactions of the ASME, Jan. 1974.

Primary Examiner—Carlton R. Croyle
Assistant Examiner—L. J. Casaregola
Attorney, Agent, or Firm—Paul Fitzpatrick

[57] ABSTRACT

A combustion method and apparatus for gas turbine engines employs a combustion process and combustion liner structure adapted to promote complete combustion of liquid hydrocarbon fuel and minimize undesired combustion products. Compressed primary air flows radially inward into a prechamber into which fuel is sprayed. Except during start-up, the air is heated. Normally, the air mixes with and evaporates the fuel and the mixture flows through a throat into a reaction chamber. The upstream end of the reaction chamber is bounded by a biconical annular wall, the inner radial portion of which diverges sharply and the outer radial portion of which diverges less sharply. The liner wall downstream of the throat defines the reaction zone and a dilution zone to which secondary air is admitted. The areas of both the primary and the secondary air entrances are variable to maintain a lean fuel-air ratio in the reaction zone throughout the operating regime.

The swirl angle of the entering primary air is variable. In starting combustion, the air is admitted with a very considerable degree of swirl, causing recirculation from the reaction chamber into the prechamber to facilitate ignition and promote fuel vaporization and stable combustion with a cold engine. After light-off, the quantity of primary air increases along with the fuel, and the primary air swirl is reduced or terminated so that the flame front is blown out of the prechamber into the reaction zone and no combustion takes place in the prechamber in the operating regime.

8 Claims, 6 Drawing Figures

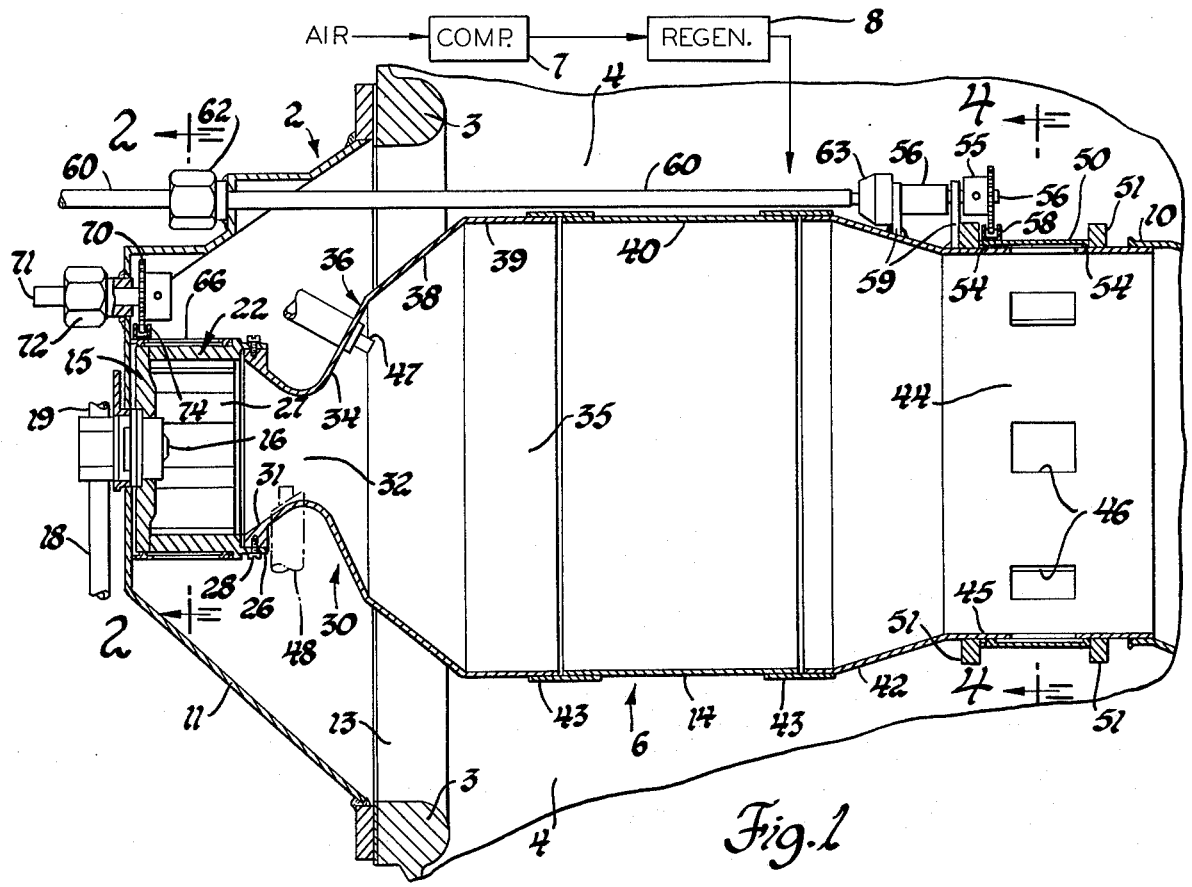
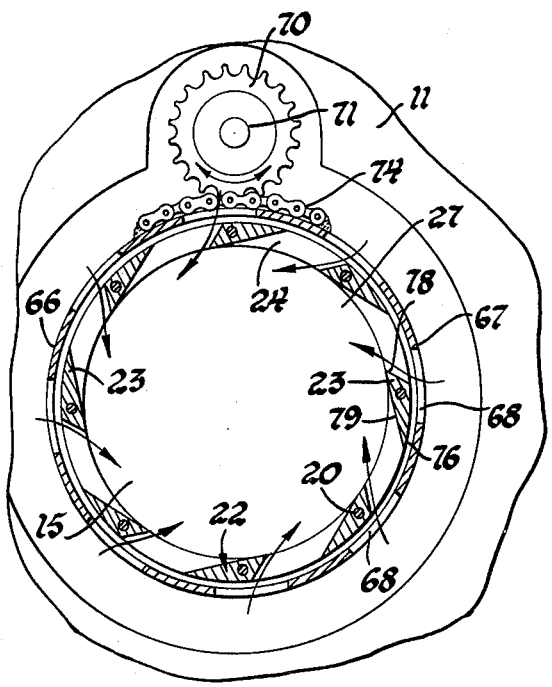
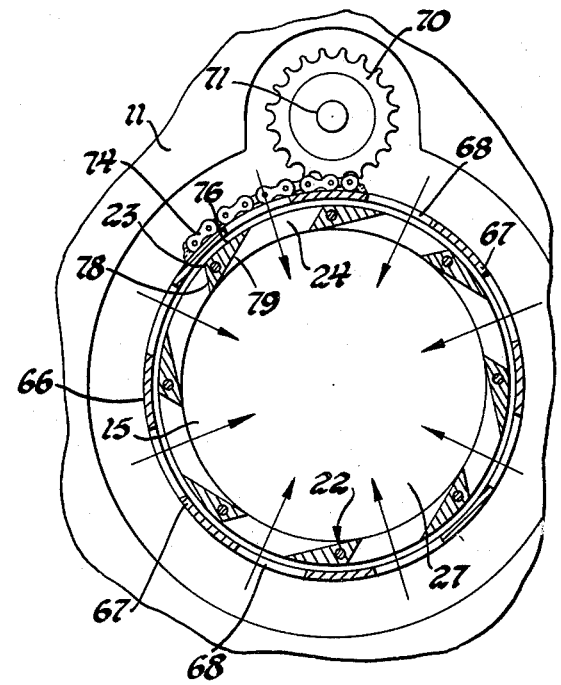
Fig.1
Fig.2
Fig.3

COMBUSTION METHOD AND APPARATUS

This invention relates to combustion apparatuses such as are adapted for use in engines such as gas turbines. In such a combustion apparatus, combustion takes place in compressed air in a relatively small space at high temperature, and the resulting combustion products are then diluted to bring the temperature down to a level acceptable to the turbine.

The technology of such combustion apparatuses has been quite highly developed to a level in which such combustors generally are compact, operate with low pressure drop, provide good temperature distribution in the outlet, are tolerant of considerably varying fuel-to-air ratios, operate over a broad spectrum of pressures and inlet air temperatures, and are characterized by long life and reliability.

State-of-the-art gas turbine combustors have had quite low output of pollutants such as carbon monoxide, imcompletely burned hydrocarbons, and particulate matter such as smoke. However, the intense combustion in these devices tends to promote combination of atmospheric nitrogen and oxygen to form undesirable oxides of nitrogen. Generally, modifications of combustion apparatus to reduce output of oxides of nitrogen increases the other pollutants. For example, low temperature combustion and quick quenching of the flame both tend to reduce nitrogen oxides at the expense of less complete combustion of the fuel.

The present invention is directed towards an improved combustion method and apparatus, and more particularly a combustion liner structure facilitating practice of the method, to promote cleaner combustion. It provides for evaporation of the fuel in the air prior to combustion, provides for burning with a lean mixture (thus reducing nitrogen oxide formation by lowering the maximum combustion temperature), and provides a combustion apparatus which may readily be ignited but which operates in a particularly clean mode during normal operation.

The structure which enables the preferred mode of combustion is characterized by a prechamber type of combustion liner with discharge from the prechamber through a convergent-divergent throat into a reaction chamber bounded by a forward wall of favorable shape. It is characterized by arrangements to vary the ratio of primary (combustion) air to secondary (dilution) air, preferably by varying the area of the entrances for both primary and secondary air to suit the operating conditions of the combustion apparatus at any time; that is, for example, the rates of supply of air and fuel to the apparatus as these vary with engine power level and ambient conditions. It is further characterized by swirling the air in the prechamber for starting combustion to promote light-off and warm-up by recirculation of hot gases from the reaction chamber into the prechamber due to such swirl. It is further characterized by reducing or eliminating the swirl of primary air during normal operation of the apparatus after light-off so that the air flows with relatively uniform velocity through the throat, this velocity being above the velocity of flame propagation so that the flame is blown out of the prechamber and remains stabilized in the reaction chamber during such normal operation of the apparatus. In such normal operation, the prevaporization of the fuel promotes very clean combustion.

The principal objects of our invention are to provide a particularly clean combustion apparatus, to provide such an apparatus which is of simple structure and of dimensions suitable for incorporation into a practicable gas turbine engine, to provide for control of the relative proportions of primary and secondary air and of the swirl component of velocity of primary air entering the prechamber; to provide improved structure for varying the quantity and direction of air entering a combustion liner; and to minimize pressure drops as far as feasible while maintaining clean combustion.

A further object of the invention is to practice an improved method of combustion in which the mode of fuel evaporation and the modes of air and fuel mixing and recirculation are such as to provide stable efficient combustion with low output of oxides of nitrogen and other undesired substances.

The nature of our invention and its advantages will be apparent to those skilled in the art from the succeeding detailed description of the method of combustion and of the preferred apparatus with which the method may be practiced, taken in connection with the accompanying drawings.

FIG. 1 is a drawing of a combustion apparatus showing the combustion liner in a sectional view taken in a plane containing the axis of the liner, the figure also illustrating schematically means for supplying hot compressed air to the combustion apparatus.

FIGS. 2 and 3 are cross sectional views of the primary air entrance structure taken on the plane illustrated by the line 2—2 in FIG. 1, illustrating respective modes of operation during light-off and normal operation.

Figure 4:
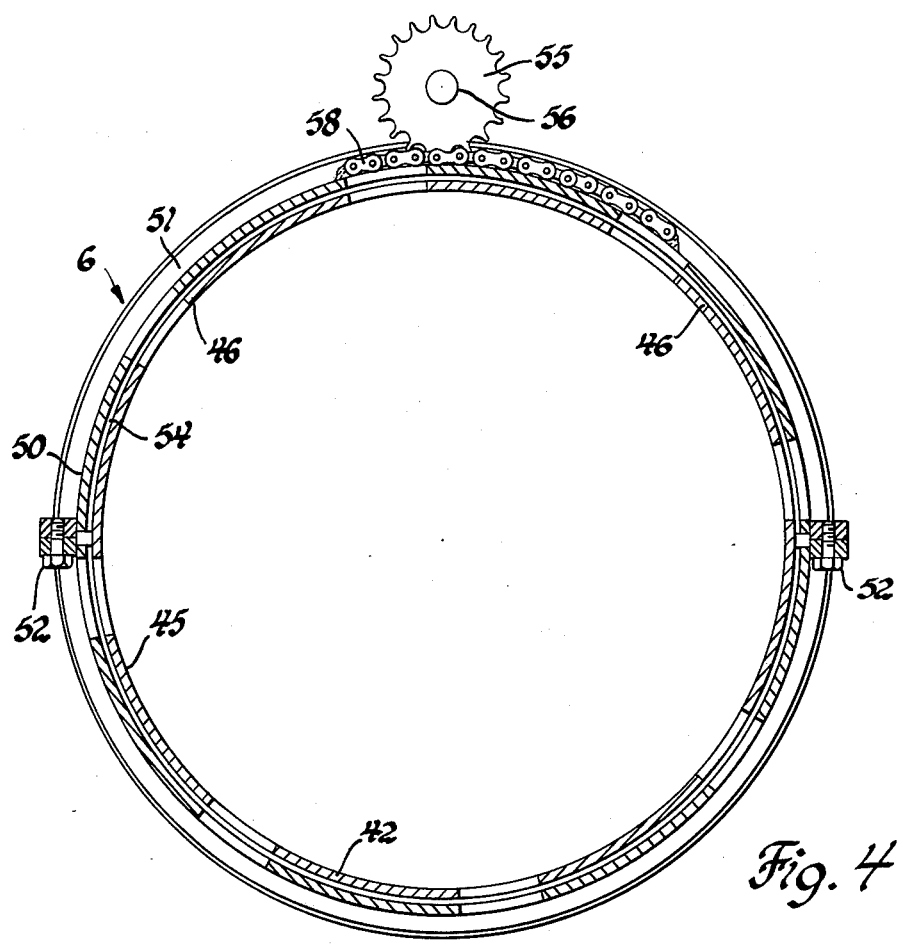
FIG. 4 is a cross section taken on the plane indicated by the line 4—4 in FIG. 1 illustrating the secondary air entrance means.

Referring first to FIG. 1, the combustion apparatus 2 illustrated is a part of a small gas turbine engine such as might be used for propulsion of automobiles. Since the invention can be understood without reference to details of the engine, these are omitted. The engine in which the combustion apparatus is used is preferably a regenerative engine; that is, one in which the compressed air flowing to the combustion apparatus is heated by heat exchange with gases exhausting from the turbine of the engine. A regenerative engine is favorable to the practice of our method of combustion, since it involves vaporization of the fuel prior to combustion which may most readily be accomplished with relatively hot air entering the combustor. In a regenerative engine, the air entering the combustor may be of the order of 900°F. or more during the normal engine operating regime.

The combustion apparatus may be employed in an engine such as that described in Collman et al. U.S. Pat. No. 3,077,074, Feb. 12, 1963 or Collman et al. U.S. Pat. No. 3,267,674, Aug. 23, 1966. Such an engine may include an engine casing or housing, shown fragmentarily at 3, which defines a plenum chamber 4 surrounding a combustion liner 6. The air for combustion is supplied to the plenum chamber 4 from the atmosphere through a compressor 7, which may operate at a pressure ratio of about 3 to 6 in such engines, through a regenerative or recuperative heat exchanger 8. As will be further described, the air flows from the plenum chamber into the combustion liner 6 where fuel is burned in it and the resulting mixture of air and combustion products are delivered through a transition conduit 10 to a turbine (not illustrated) which drives the compressor. The turbine may drive an external load, or a second turbine may do so.

The enclosure for the combustion apparatus includes, in part, a removable cover plate 11 which is secured by bolts (not shown) over an opening 13 in the housing or casing 3. The combustion liner 6 is fixed at its upstream end to the cover plate 11 and is telescoped at its downstream end into the transition conduit 10, thus being supported at both ends with freedom for expansion. The housing as such is immaterial to our invention which lies in the mode of combustion and in the structure of liner 6 enabling this mode of operation.

The liner 6 illustrated is of circular cross section, which is preferred although not mandatory. The liner thus is defined by wall means 14 of circular cross section and an upstream end plate 15. End plate 15 may be suitably fixed to the cover plate 11. A fuel spray nozzle 16, which is preferably of an air-assist spray type, extends through the center of the annular end plate 15. This nozzle is supplied with liquid hydrocarbon fuel through a fuel pipe 18 and with atomizing air at a pressure slightly above that within the liner through a pipe 19. The air may be supplied as described in Flanigan et al. U.S. Pat. No. 3,095,707, July 2, 1963.

End plate 15 is fixed by machine screws 20 (see also FIG. 2) to a squirrel-cage-like primary air entrance structure 22. This structure comprises eight parallel contoured bars 23 defining between them axially and radially extending entrance slots 24 for primary air; that is, the air in which the fuel is burned. The bars 23 and slots 24 may be formed by milling the slots through a generally cylindrical structure. Structure 22 includes a rearwardly extenging flange 26 for connection to the downstream portions of the liner. The air entrance structure 22 defines the major portion of the outer wall of a prechamber 27.

Flange 26 is fixed by a ring of machine screws 28 to the upstream end of a convergent-divergent liner portion 30. This portion comprises a converging wall portion 31, a streamlined throat 32, and a downstream diverging portion 34. The converging and diverging portions of the throat provide a smooth transition as indicated on FIG. 1. The prechamber terminates at the throat 32; the wall 31 thus constitutes a portion of the prechamber wall. A reaction chamber 35 in which combustion normally takes place extends downstream from the throat 32. The upstream end of the reaction chamber 35 is defined by a dual-diverging or biconical wall 36, the inner portion of which is the previously referred to diverging portion 34 of the throat portion. The conical wall portion 34 diverges at an angle of 62° to the axis of the liner. It extends about halfway radially from the throat to the outermost diameter of the combustion liner. The remainder of the forward wall of the reaction chamber is defined by a conical wall portion 38 extending at an angle of 38° to the axis of the liner. While the angles of divergence may be varied to some extent, those specified have been found satisfactory.

A reaction chamber outer wall extends downstream from the conical forward wall portion 38. This comprises a first section 39 which may be integral with the forward wall portion 36, an intermediate portion 40, and a downstream slightly converging portion 42. Portions 39, 40, and 42 may be connected together by sleeves 43 welded, brazed, or otherwise fixed to the liner wall portion.

The farthest downstream portion of liner 6 defines a dilution zone 44 through which the combustion products flow to the transition conduit 10. The dilution zone provides for entry, and mixture with the combustion products, of additional heated compressed air from the plenum chamber 4. The secondary or dilution air enters through a ring of ports 46. While eight ports are shown, the number of ports may be more or less. It should be understood that the fuel should be completely burned by the time the combustion products flowing through the liner reach the dilution ports 46 and that this secondary air does not enter into the combustion to any observable extent. All of the combustion air is supplied through the primary air entrance 22. The combustion liner differs from many prior art liners in the omission of various additional holes, ports, film air entrances and the like for admission of air to cool the liner or complete combustion along the wall of the liner downstream of the entrance 22.

Combustion is initiated by an electric spark type igniter 47 which may be of conventional structure. The mounting of this igniter on the cover plate 11 is not illustrated; it is shown out of plane in the view for clarity. An alternative location for the igniter just upstream of the throat 32 is illustrated in broken lines at 48.

The area for entrance of secondary air is varied by a ported cylindrical sleeve 50 (FIG. 4) rotatable on the exterior of the liner wall portion 45 and located axially of the liner between bosses 51 fixed to the outer surface of the liner. As shown clearly in FIG. 4, the sleeve 50 is in two semicylindrical sections joined by cap screws 52 extending through flanges at the ends of the sections. Circumferential interior ribs 54 adjacent to the margins of the sleeve minimize rotational friction on the liner. Rotation of the sleeve to vary the area of dilution air ports 46 is accomplished by rotation of a sprocket 55 fixed to a shaft 56. The sprocket coacts with a short length of chain 58, similar to bicycle chain, which is welded to the outer surface of sleeve 50. Shaft 56 is rotatably supported in brackets 59 welded to the liner wall 14. It is coupled to a control shaft 60 which extends through a leak-minimizing support 62 in cover plate 11, which may be termed a gland. A coupling 63 allowing some freedom for relative axial movement is provided between the shafts 60 and 56 to accommodate expansion of the liner. Area of the secondary air ports 46 may thus be modulated by rotation of shaft 60.

The primary air entrance structure 22, in addition to the cylindrical body with more or less tangential inlet slots 24 already described, comprises a sleeve 66 (FIGS. 1–3) rotatable on the exterior of the structure 22 to vary air flow. The rotatable sleeve 66 for this purpose is the same structurally as the sleeve 50 except for dimensions, and is rotated in the same way. It defines eight parallel bars 67 separated by ports 68 which may register variably with the slots 24. Sleeve 66 is located axially between a radially extending flange on body 22 downstream of the entrance slots 24 and the cover plate 11. It has circumferentially extending ridges on its inner surface adjacent the edges to bear against the interior support on which it rotates. A sprocket 70 fixed to a shaft 71 which extends through a gland 72 mounted on the cover 11 meshes with a length of link chain 74 welded to the outer surface of the sleeve 66. By coordinated rotation of shafts 60 and 71 by any suitable control or, for that matter, even manually, the actual areas and therefore the relative areas and relative flows at the primary and secondary air entrances may be varied as desired.

Additionally, the angle of swirl of the primary air entering the apparatus may be varied, as can be seen with reference to FIGS. 2 and 3.

As identified in FIG. 3, each bar 23 is of approximately triangular or prismatic cross section with an outer cylindrical bounding surface 76, a projecting surface 78 which makes an obtuse angle with surface 76, and a receding or interior surface 79 which makes an acute angle with surface 76. With the swirler in the condition of FIG. 2 employed for light-off of the combustor, flow is throttled between the counterclockwise edge of each bar 67 and the projecting surface 78 of each bar 23. Air entering the prechamber 27 is thus given a substantial swirl or tangential component of velocity in the counterclockwise direction, as illustrated in FIG. 2. If the sleeve 66 is rotated counterclockwise from the position illustrated, the area will be increased, and the ratio of primary to secondary air flow will be increased if other conditions are maintained constant. However, the direction of flow will not change greatly and the relation of the tangential component to the radial component of velocity of the air will remain approximately constant. If the sleeve 66 is rotated clockwise from the position of FIG. 2, the area and the quantity of primary air are decreased. The sleeve may be rotated sufficiently to cover all of the entrance slots 24 and thus substantially block all air flow into the prechamber.

Upon further rotation of the sleeve 66 clockwise, a condition is arrived at as shown in FIG. 1 where the flow is throttled between the counterclockwise edge of bars 67 and the acute angle at the clockwise edge of each bar 23. The interior surface 79 of the bar 23 is out of the way of the flow, and likewise the projecting surface 78. Since there is nothing to deflect the entering air, it enters substantially radially and there is no appreciable swirl within the prechamber or at the discharge from the prechamber to throat 32. Of course, if there is swirl in the prechamber, this tends to be accentuated as the flow converges into the throat. FIG. 3 shows the primary air inlet in its maximum flow position for no-swirl air entry. Sleeve 66 may be rotated counterclockwise as shown to reduce flow while retaining the no-swirl condition.

When the primary air flow is swirling, the air flow from the prechamber into the reaction chamber tends to follow closely the wall of the convergent-divergent portion 30, leaving a low pressure area along the axis of the throat 32 through which flame or combustion products may recirculate from the reaction chamber into the prechamber. On the other hand, when there is no swirl, there is roughly constant velocity over the area of the throat and thus no tendency to recirculate from the reaction chamber into the prechamber. The apparatus is designed so that the throat 32 is sufficiently small that the velocity of the air through this throat under the no swirl condition; that is, over the normal operating regime, is above the flame propagation velocity so as to blow the flame out of the prechamber and prevent re-establishment of combustion in the prechamber. This is vital to the clean operation of the burner, as will be further described.

Obviously, it is undersirable to constrict the throat 32 more than is necessary to secure the ejection of the flame from the prechamber, since any restriction of the throat tends to increase the pressure drop imparted to the primary air, requires additional throttling of the secondary air, and thus results in a loss of energy in the form of pumping losses. The optimum throat area may be determined by computation or experiment for any particular installation.

Variation of the ratio of primary to dilution air can, as has been taught in the literature, be achieved by variation of either the primary or seconary air ports alone. However, pressure drop is minimized for a given range of modulation of relative primary and secondary flows by a structure which provides for control of both primary and secondary air. As pointed out above, our structure provides not only for this, but for entry of the primary air either with significant swirl or with no significant swirl.

The primary air flow control structure illustrated in FIGS. 1, 2, and 3 is preferred because of its simplicity and effectiveness. It will be appreciated, however, that the variation of flow area and of swirl angle could be obtained by other constructional means.

Dimensions of the combustion liner are functions of the air flow, pressure level, and other parameters of engine operation and thus will vary with the engine. The particular liner described is illustrated to scale in FIG. 1. It is dimensioned for an engine with 2.6 lbs. per second maximum air flow at 4 to 1 pressure ratio, and a power output of 225 horsepower. The particular liner is about 6½ inches in diameter and is 15 inches in length from the end plate 15 to the discharge end of the liner. The interior diameter of the prechamber is 2½ inches and the throat is 1.6 inches in diameter.

Figure 6:
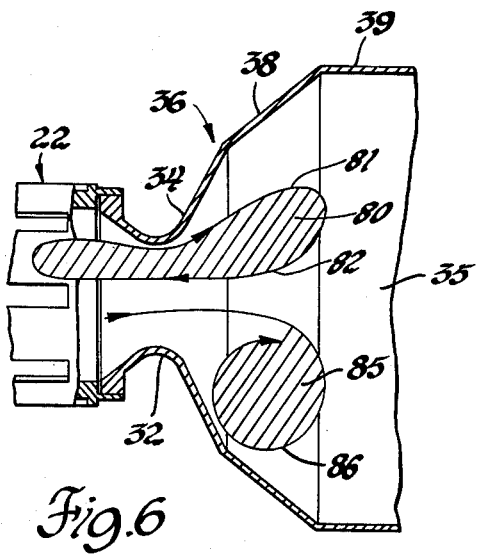
FIG. 6 is a sketch illustrating the two different gas recirculation modes that are generated in the combustor as a result of the biconical configuration of the forward wall of the reaction zone when swirling of the air is either purposely promoted or reduced in the prechamber.

FIG. 6 is a sectional sketch of the throat area and forward end of the reaction chamber to illustrate flame recirculation in the two forms of combustion. Recirculation of burning fuel-air mixture is illustrated above the centerline of FIG. 6 during starting conditions, with high swirl in the prechamber, associated with a burning zone or central recirculation zone 80. The burning fuel and air flow downstream along the upper portion 81 of the arrow. Some is drawn inwardly to the low pressure area along the axis of the combustor and flows forwardly as indicated at 82 through the central portion of the throat into the prechamber. There is thus a circulation out through the outer portion of the throat 32 and back into the prechamber through the central portion of the throat.

When the combustion chamber is brought into the normal operating range and the swirl is substantially terminated, the flame front is blown out of the prechamber and there is no recirculation into the prechamber. The nature of the recirculation of the flame is indiated by the arrow 86 and the shaded area 85 enclosed by it as illustrated below the centerline of FIG. 6. This is the concentric recirculation zone or toroidal recirculation zone characteristic of normal clean combustion in the combustion apparatus.

With the biconical shape of the forward end of the reaction chamber shown in FIG. 6, less pressure drop is required to force the flame out of the prechamber and combustion occurs further upstream during normal operation than are the cases with a reaction chamber where the angle of divergence of the forward end is constant, approximating 38° from the axis.

When the flame has been established and is fully expelled from the prechamber, there is substantially invisible burning in the reaction chamber recirculation zone 85 of the previously formed mixture of vaporized fuel and air. This is attended by extremely low emissions of carbon monoxide and nitrogen oxides, as well as unburned hydrocarbons and smoke, which are much less a problem than are carbon monoxide and nitrogen oxides.

Figure 5:
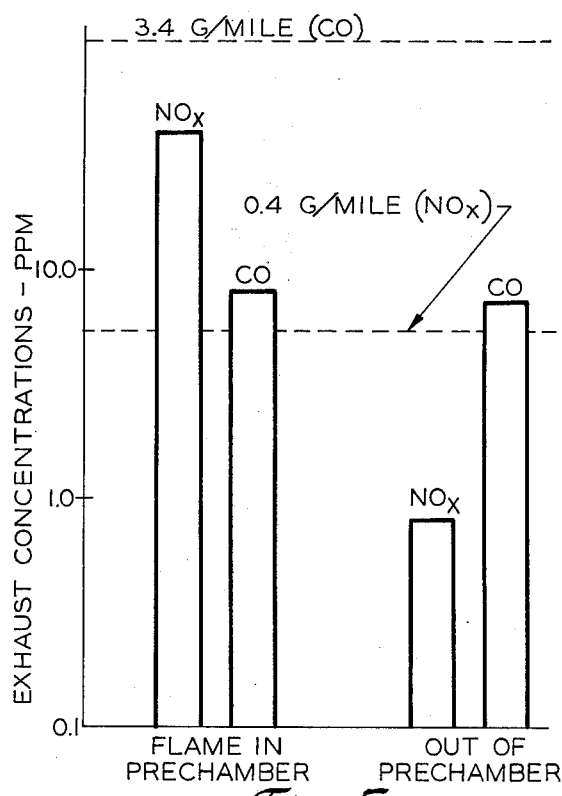
FIG. 5 is a chart illustrating typical combustor exhaust concentrations of carbon monoxide and oxides of nitrogen measured with the flame either in or out of the prechamber.

FIG. 5 illustrates the magnitude of the reduction in the emissions of nitrogen oxides that can be obtained when the flame is forced out of the prechamber while using the combustion apparatus shown in FIGS. 1 through 4 and operated as described above. Note that the vertical scale is a logarithmic scale of nitrogen oxide and carbon monoxide concentrations in parts per million. Concentration data are shown for a typical stabilized combustor operating condition where the flame is either in or out of the prechamber. The broken line identified as 3.4 g/mile (CO) represents the maximum allowable carbon monoxide content, assuming a vehicle fuel consumption of ten miles per gallon. The broken line identified as 0.4 g/mile ($NO_x$) represents the allowable production of nitrogen oxides, assuming the same fuel consumption.

The "flame in prechamber" condition was established by setting the air inlet swirler one-third open and positioning it to swirl the air in the prechamber as indicated in FIG. 2 and setting the secondary air ports 46 fully open. With the flame in the prechamber as indicated in FIG. 6, the concentration of carbon monoxide is less but the concentration of nitrogen oxides is considerably greater than the prescribed limits. The air inlet swirler was then set two-thirds open and positioned to minimize the swirling of the air in the prechamber as indicated in FIG. 3 and the secondary air ports were set three-quarters open. The flame was forced out of the prechamber. Note that while the concentration of carbon monoxide decreased slightly, the concentration of nitrogen oxides decreased substantially to less than 10 percent of the prescribed limit.

The flame may be kept out of the prechamber and stabilized in the reaction chamber for various rates of fuel and air flow by suitable modulation of the primary and secondary air entrance areas. These may be coupled to an automatic control which has been calibrated in terms of the characteristics of the particular combustion apparatus discharging through the particular turbine nozzle or other structure. The opening of the primary or secondary ports may be controlled as a function of air pressure, fuel pressure, engine power level setting or other parameter related to the level of engine operation and air flow.

Experiments have been undertaken with combustion apparatuses of the sort illustrated with much shorter reaction zones than that illustrated. It has been shown by these experiments that the combustion products are acceptably clean under steady-state conditions but that the pressure drop is notably higher with the shorter combustion liner. Also, the longer liner is considered to have more latitude under transient conditions accompanying changes in engine power level. With the preferred liner, which is 15 inches long and has a reaction zone about 10½ inches long, the ratio of pressure drop to inlet pressure was about 3.0 percent for the operating condition that caused the flame to remain in the prechamber and about 7.9 percent under the operating conditions that forced the flame out of the prechamber. It may well be that future development of the combustion liner described may lead to reductions in the pressure drop and thus to an increase in efficiency of the engine employing the combustion apparatus.

The combustion liner illustrated is made of stainless steel. Other heat-resistant alloys might be employed, and also consideration has been given to providing a ceramic liner lining for the reaction zone walls to provide greater heat resistance.

Combustion in the apparatus takes place near the lean limit; that is, the highest ratio of air to fuel under which combustion is possible, and the upper limit of combustion temperature is about 2800°F. Higher temperatures would increase the production of nitrogen oxides. The lean combustion and substantially constant temperature limits may be maintained by suitable control of the ratio of primary to secondary air so that the ratio of primary air to fuel will remain substantially constant near the lean limit.

It may be noted that the throat 32 acts as an aerodynamic separator between the prechamber and the reaction chamber. Forcing the flow of fuel through the throat also acts to improve the uniformity of mixture of the fuel and air. The throat, along with the provision for varying the amount of swirl of the air entering the prechamber, serves both as means for providing recirculation into the prechamber during initiation of combustion, and for preventing such recirculation during normal combustion so as to minimize emissions.

With hot air supplied to the combustion apparatus through a regenerator, recirculation is not needed to secure vaporization of the droplets of fuel sprayed by the nozzle 16. During light-off, particularly with a cold engine, the air is relatively cool, being heated to some extent by compression, but it is not sufficiently warm to achieve good vaporization of the fuel. This is promoted by recirculation of flame or combustion products during the swirling start-up operation.

The biconical configuration of the forward wall of the reaction chamber promotes flame stabilization in the reaction chamber during both high and low swirling modes of gas entry into the reaction chamber. In the low swirling mode, gas recirculation in the reaction chamber is promoted away from the longitudinal axis of the liner by the more abrupt upstream divergent section. In the high swirling mode, gas recirculation in the reaction chamber is promoted along the longitudinal axis of the liner by the less divergent downstream section.

It should be clear to those skilled in the art that the foregoing specification and the accompanying drawings disclose a new and highly beneficial method of and apparatus for burning fuel particularly well suited to the requirements of a gas turbine engine and particularly adapted to minimize undesirable exhaust products.

The detailed description of the preferred embodiment of the invention for the purpose of explaining the principles thereof is not to be considered as limiting or restricting the invention, since many modifications may be made by the exercise of skill in the art.

We claim:

1. A method of generating combustion products for operating a gas turbine comprising compressing air, heating the air, flowing a portion of the heated compressed air as primary air into a prechamber, supplying fuel to the prechamber, mixing the fuel and primary air and varporizing the fuel in the prechamber, discharging the air-fuel mixture through a throat into a reaction chamber, burning the fuel in the reaction chamber, flowing the remainder of the heated compressed air as secondary air, mixing the secondary air with the combustion products flowing from the reaction chamber, controlling the relative proportions of primary and secondary air so as to maintain a constantly lean ratio of fuel to primary air over the operating regime, and concurrently controlling the swirl of the primary air entering into the prechamber so as to insure vaporization and homogeneous mixing of the fuel with the air, imparting substantial swirl to the primary air during start-up of combustion sufficient to promote recirculation from the reaction chamber into the prechamber to stabilize combustion, and imparting sufficiently slight swirl to the primary air throughout the operating regime to insure the expulsion of flame from the prechamber and complete combustion of the lean fuel-air mixture in the reaction zone to minimize undesired components in the resulting combustion products.

2. A method of generating combustion products for operating a gas turbine comprising compressing air, heating the air, flowing a portion of the heated compressed air as primary air into a prechamber, supplying fuel to the prechamber in atomized condition, mixing the fuel and primary air and vaporizing the fuel in the prechamber, discharging the air-fuel mixture through a throat into a reaction chamber, burning the fuel in the reaction chamber, flowing the remainder of the heated compressed air as secondary air, mixing the secondary air with the combustion products flowing from the reaction chamber, controlling the relative proportions of primary and secondary air so as to maintain a constantly lean ratio of fuel to primary air over the operating regime, and concurrently controlling the swirl of the primary air entering into the prechamber so as to insure vaporization and homogeneous mixing of the fuel with the air, imparting substantial swirl to the primary air during start-up of combustion sufficient to promote recirculation from the reaction chamber into the prechamber to stabilize combustion, and imparting sufficiently slight swirl to the primary air and sufficient flow velocity through the throat throughout the operating regime to insure the expulsion of flame from the prechamber and complete combustion of the lean fuel-air mixture in the reaction zone to minimize undesired components in the resulting combustion products.

3. A method of generating combustion products for operating a gas turbine comprising compressing atmospheric air, heating the air by regeneration, flowing a portion of the heated compressed air as primary air into a prechamber, supplying fuel to the prechamber, mixing the fuel and primary air and vaporizing the fuel in the prechamber, discharging the air-fuel mixture through a throat into a reaction chamber, burning the fuel in the reaction chamber, flowing the remainder of the heated compressed air as secondary air, mixing the secondary air with the combustion products flowing from teh reaction chamber, controlling the relative proportions of primary and secondary air so as to maintain a constantly lean ratio of fuel to primary air over the operating regime, and concurrently controlling the swirl angle and rate of flow of the primary air entering into the prechamber so as to insure vaporization and homogeneous mixing of the fuel with the air, imparting substantial swirl to the primary air during start-up of combustion sufficient to promote recirculation of flame from the reaction chamber into the prechamber to stabilize combustion with low fuel and primary air flow rates, and imparting sufficiently slight swirl to the primary air throughout the operating regime with higher fuel and primary air flow rates to insure the expulsion of flame from the prechamber and complete combustion of the lean fuel-air mixture in the reaction zone to minimize undesired components in the resulting combustion products.

4. A method of generating combustion products for operating a gas turbine comprising compressing air, heating the air by regeneration, flowing a portion of the heated compressed air as primary air into a prechamber, supplying fuel to the prechamber, mixing the fuel and primary air and vaporizing the fuel in the prechamber, discharging the air-fuel mixture through a throat into a reaction chamber, burning the fuel in the reaction chamber, flowing the remainder of the heated compressed air as secondary air, mixing the secondary air with the combustion products flowing from the reaction chamber, controlling the relative proportions of primary and secondary air so as to maintain a constantly lean ratio of fuel to primary air over the operating regime, and regulating the swirl angle of the primary air during start-up to produce a high swirl velocity thereof entering into the prechamber so as to insure vaporization and homogeneous mixing of the fuel with the air, to insure recirculation from the reaction chamber into the prechamber during start-up of combustion, and to further regulate swirl angle after start-up to cause reduced swirl velocity to block such recirculation and insure expulsion of flame from the prechamber during normal operation after start-up.

5. A method of generating combustion products for operating a gas turbine comprising compressing air, heating the air by regeneration, flowing the air into a combustion apparatus having a throat, a prechamber upstream of the throat, a reaction chamber downstream of the throat, and a dilution zone downstream of the reaction chamber through a primary air throttling valve into the prechamber and through a secondary air throttling valve into the dilution zone, spraying fuel into the prechamber, manipulating the valves so as to maintain a constantly lean ratio of fuel to primary air over the operating regime, and regulating the swirl angle of the primary air in the prechamber during start-up to raise swirl velocity of the primary air so as to insure vaporization and homogeneous mixing of the fuel with the air, and to further regulate swirl angle of the primary air following start-up to reduce the swirl velocity of the air to insure the elimination of flame in the prechamber duing normal operation of the apparatus.

6. A combustion apparatus for a gas turbine engine or the like comprising, in combination, means defining a housing adapted to receive a flow of hot compressed air; a combustion liner in the housing comprising imperforate wall means extending from the upstream end of the liner to the downstream end of the liner; fuel spray means at the upstream end of the liner; a combustion products outlet and the downstream end of the liner; the liner defining a prechamber at the upstream end, a convergent-divergent section bounding a throat providing an outlet from the prechamber, and a reaction chamber downstream of the throat having a forward wall defined by a divergent part of the wall means extending downstream from the throat, the said forward wall having a radially inner annular portion flaring sharply and a radially outer annular portion flaring less sharply; the wall means extending downstream from the forward wall past the reaction chamber and past a dilution zone to the said outlet; the fuel spray means being disposed in the prechamber; the prechamber wall means including a primary air swirler having means defining the sole entrance of primary combustion air from the said housing into the liner, the swirler being variable in effective area to vary primary air flow and variable in configuration to vary the swirl angle of the primary air; means defining secondary air ports for admitting dilution air from the said housing into the dilution zone for mixing with combustion products flowing from the reaction chamber to the said outlet; and means for varying the area of the secondary air ports effective along with variation of effective area of the primary air ports to control the equivalence ratio in the reaction zone; at least substantially all of the combustion air being supplied through the primary air swirler; the primary air swirler being effective to reduce the swirl velocity with increase in effective area of the swirler.

7. A combustion apparatus for a gas turbine engine or the like comprising, in combination, means defining a housing adapted to receive a flow of hot compressed air; a combustion liner in the housing comprising imperforate wall means extending from the upstream end of the liner to the downstream end of the liner; fuel spray means at the upstream end of the liner; a dilution zone and a combustion products outlet at the downstream end of the liner; the liner defining a prechamber at the upstream end, a convergent-divergent section bounding a throat providing an outlet from the prechamber, and a reaction chamber downstream of the throat having a forward wall defined by a divergent part of the wall means extending downstream from the throat; the wall means extending downstream from the forward wall past the reaction chamber to the dilution zone, the fuel spray means being disposed in the prechamber; the upstream end of the liner at the prechamber including a primary air swirler squirrel cage means defining the sole entrance for primary combustion air from the said housing into the prechamber, sleeve means movable with respect to said cage to vary the swirl angle of the primary air into said prechamber, said sleeve means and squirrel cage means including air flow control means adjustably positioned at start-up to produce a high swirl velocity entering into the prechamber to insure recirculation from the reaction chamber into the prechamber during start-up, said flow control means having a second position following start-up to produce reduced swirl velocity into the prechamber to block such recirculation to enhance expulsion of flame from the prechamber during normal operation, means defining secondary air ports for admitting dilution air from the said housing into the dilution zone for mixing with the combustion products flowing from the reaction chamber to the said outlet; and means for varying the ratio of effective areas of the secondary air ports and the primary air ports to control the equivalence ratio in the reaction zone.

8. A combustion apparatus for a gas turbine engine or the like comprising, in combination, means defining a housing adapted to receive a flow of hot compressed air; a combustion liner in the housing comprising imperforate wall means extending from the upstream end of the liner to the downstream end of the liner; fuel spray means at the upstream end of the liner; a dilution zone and a combustion products outlet at the downstream end of the liner; the liner defining a prechamber at the upstream end, a convergent-divergent section bounding a throat providing an outlet from the prechamber, and a reaction chamber downstream of the throat having a forward wall defined by a divergent part of the wall means extending downstream from the throat, the said forward wall having a radially inner annular portion flaring sharply and a radially outer annular portion flaring less sharply; the wall means extending downstream from the forward wall past the reaction chamber to the dilution zone; the fuel spray means being disposed in the prechamber; the upstream end of the liner at the prechamber including a primary air swirler squirrel cage means defining the sole entrance for primary combustion air from said housing into the prechamber, sleeve means movable with respect to said cage to vary the swirl angle of the primary air into said prechamber, said sleeve means and squirrel cage means including air flow control means adjustably positioned at start-up to produce a high swirl velocity entering into the prechamber to insure recirculation from the reaction chamber into the prechamber during start-up, said flow control means having a second position following start-up to produce reduced swirl velocity into the prechamber to block such recirculation to enhance expulsion of flame from the prechamber during normal operation, the wall means defining secondary air ports for admitting dilution air from the said housing into the dilution zone for mixing with combustion products flowing from the reaction chamber to the said outlet; and means for varying the ratio of effective areas of the secondary air ports and the primary air ports to control the equivalence ratio in the reaction zone; at least substantially all of the combustion air being supplied through the primary air swirler.

* * * * *